United States Patent [19]

Tanaka et al.

[11] Patent Number: 5,244,060

[45] Date of Patent: Sep. 14, 1993

[54] ELEVATOR APPARATUS

[75] Inventors: Masakatsu Tanaka; Masayuki Shigeta; Jun Sugahara; Masanobu Itoh; Ichiro Nakamura, all of Katsuta, Japan

[73] Assignee: Hitachi, Ltd., Tokyo, Japan

[21] Appl. No.: 879,988

[22] Filed: May 8, 1992

[30] Foreign Application Priority Data

May 9, 1991 [JP] Japan .................. 3-104118

[51] Int. Cl.$^5$ .............................. B66B 11/04
[52] U.S. Cl. ...................... 187/20; 187/73; 187/108
[58] Field of Search .......... 187/20, 32, 34, 73, 187/35, 105, 108, 109, 110; 188/74, 75, 161, 162, 171, 2 A

[56] References Cited

U.S. PATENT DOCUMENTS 2,914,138 11/1959 Borden .................. 187/108
4,975,627 12/1990 Reddy .................. 187/108

FOREIGN PATENT DOCUMENTS 1205022 5/1986 Canada .................. 187/20
1959025 11/1969 Fed. Rep. of Germany ........ 187/73
59447 5/1977 Japan .................. 187/73
1-48879 8/1985 Japan.

Primary Examiner—Robert P. Olszewski
Assistant Examiner—Kenneth Noland
Attorney, Agent, or Firm—Antonelli, Terry Stout & Kraus

[57] ABSTRACT

An elevator apparatus is provided with a hoisting unit including a drive sheave for winding a rope around it. The hoisting unit includes a rotary member. The rope has a car attached at one end thereof for suspending. A braking force is applied to the rotary member by a biasing unit. The braking force against the rotary member is released by a releasing unit, and is reduced by a reducing unit. In emergency stop of such an elevator apparatus, slipping of the rope is not caused to control the braking force with ease.

15 Claims, 8 Drawing Sheets

ELEVATOR APPARATUS

BACKGROUND OF THE INVENTION

1. Field of the Invention

The present invention relates to an elevator apparatus, and particularly relates to an elevator apparatus which is capable of controlling braking force for emergency stop.

2. Prior Art

Generally, in elevators, a rope is wound around a drive sheave of a hoist, and has a car and a counterweight attached to the opposite ends thereof such a well bucket. By rotating the drive sheave the car or cab and the counterweight are vertically moved. The hoist is provided with a braking unit. The car is retarded by an electric brake of the motor of the hoist until the car reaches to a desired story, and then the car is held still by activating the braking unit.

In such elevators, the car is suddenly stopped by actuating the braking unit for emergency stop. To reduce a shock to passengers in the car in emergency stop, a representative attempt has been made in Japanese patent unexamined Publication No. 60-148879, for example, in which an electromagnetic brake unit is used for releasing braking forces of mechanical springs. When an emergency stop command is issued, it has been taken into consideration that braking forces of the springs are reduced by decreasing energizing current of the electromagnetic brake unit.

In the earlier attempt, it is very hard to reduce braking force of the springs by decreasing energizing current of the electromagnetic brake unit. Braking force by the springs rapidly increases since once energizing current is reduced, it rapidly drops. For this reason, the rope of the car is liable to slip over the drive sheave, which is being rapidly decelerated, causing the stop distance of the car to be enlarged. The friction coefficient between the rope and the drive sheave is greatly reduced after slip of the rope is started, so that the amount of slip of the rope becomes excessively large, and passengers in the car therefore have uneasiness.

SUMMARY OF THE INVENTION

It is an object of the present invention to provide an elevator apparatus which produces little slip of rope even in emergency stoppage.

A further object of the present invention is to provide an elevator apparatus which provides a stoppage shockless as compared with the conventional elevator apparatuses in emergency stop.

It is a further object of the present invention to provide an elevator apparatus which is capable of adjusting the braking force thereof with ease in emergency stoppage.

It is a further object of the present invention to provide an elevator apparatus which is provided with a novel braking unit which necessitates a installation space smaller than that of the conventional elevator apparatuses.

In view of these and other objects, the present invention provides an elevator apparatus comprising: a hoisting unit including a drive sheave for winding a rope therearound, the hoisting unit including a rotary member, the rope having a car attached at one end thereof for suspending; braking force biasing means for biasing a braking force against the rotary member thereof; releasing means for releasing the braking force against the rotary member thereof; and reducing means for reducing the braking force against the rotary member thereof.

With such a construction, a braking force in emergency stoppage is appropriately reduced by the braking force reducing means which is separate from the braking force releasing means which have been activated during normal operation. According to the present invention, the controlling of the braking force is achieved by selecting and activating the braking force releasing means or the braking force reducing means, and thus becomes simple and stabilized as compared to the prior art in which the braking force is reduced by the braking force releasing means. As a result, according to the present invention there is no rapid deceleration of the drive sheave, so that there is no slip between the drive sheave and the rope. This enables the car to be safely stopped, and a stoppage shock to be reduced. It is possible to arrange the braking force reducing means closely to the braking force releasing means, and the installation space of the braking unit hence does not considerably increase.

DETAILED DESCRIPTION OF THE PREFERRED EMBODIMENTS

Figure 1:
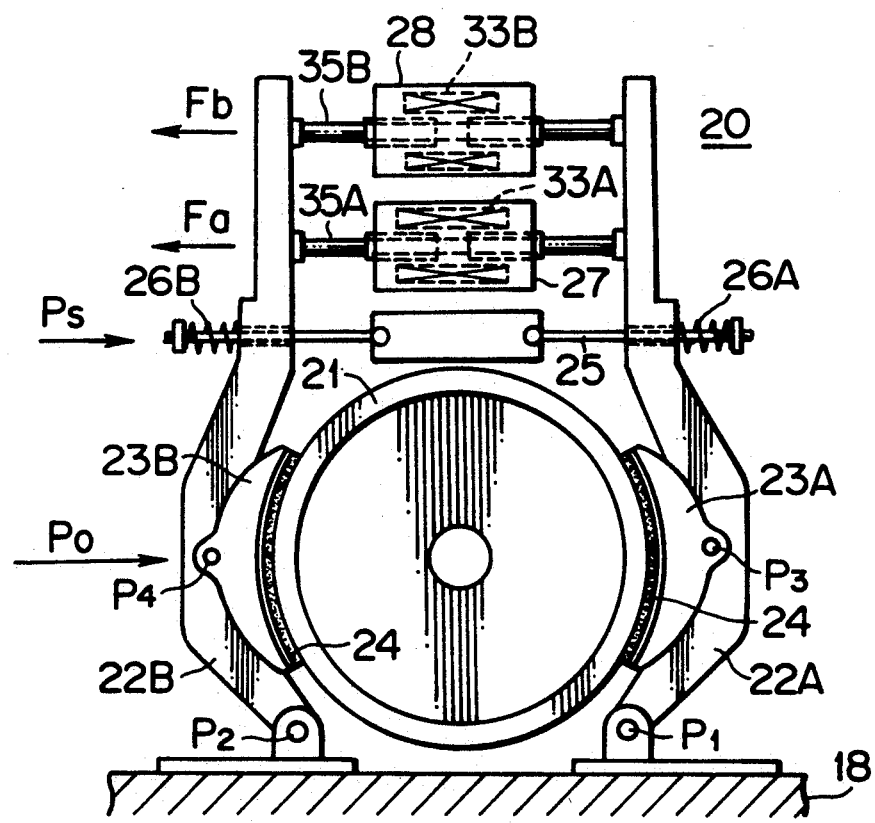
FIG. 1 is a front view of a braking unit of an elevator apparatus according to the present invention.
Figure 2:
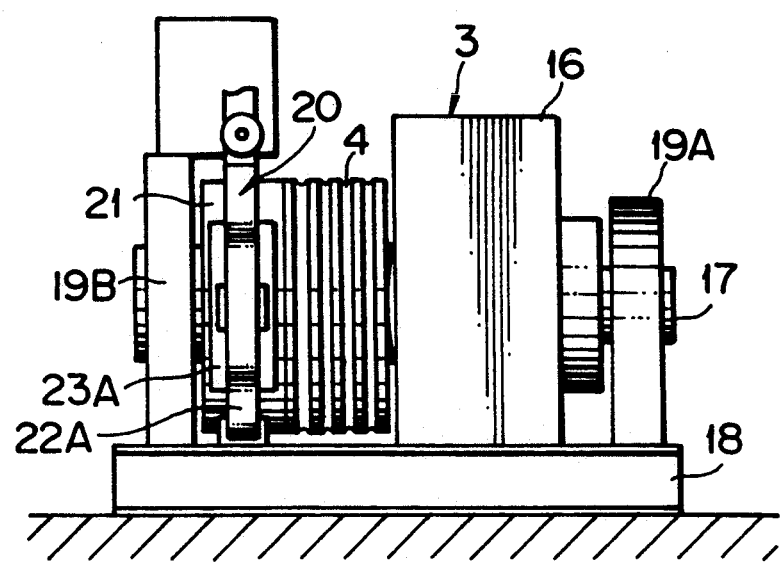
FIG. 2 is a right side view of the hoisting unit of the elevator apparatus shown in FIG. 1.
Figure 3:
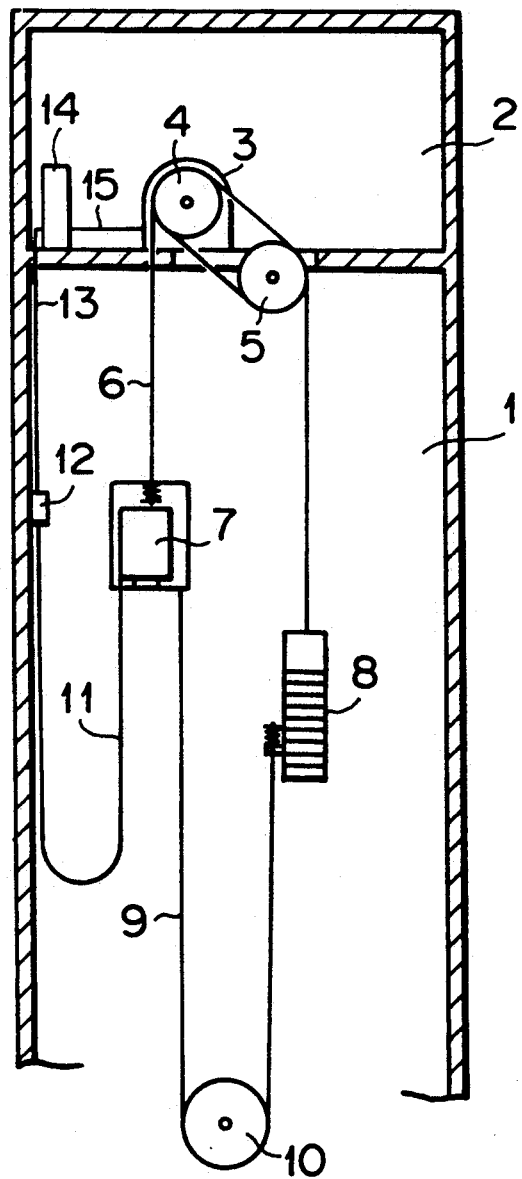
FIG. 3 is schematic diagram of the elevator apparatus using the braking unit of FIG. 1.

Referring to FIGS. 1 to 7, one embodiment of the present invention will be described. Generally, as shown in FIG. 3, an elevator is provided on the top of a elevating passage 1 with a machine room 2, in which a hoist 3 is installed. A rope 6 is extended between a drive sheave 4 of the hoist 3 and a beam pulley 5. The rope 6 has a car or cab 7 and a counterweight 8 joined at respective opposite ends thereof, and the car 7 and the counterweight 8 are suspended such as well baskets. The car 7 and the counterweight 8 are guided only in the vertical direction by guide rails (not shown) arranged within the elevating passage 1.

A balancing rope 9 which interconnects the car 7 and the counterweight 8 is suspended from them, and extends at the lowest level around a balancing pulley 10 for tightening. A tail cord 11 which includes electric wires for lighting and signal lines for controlling the elevator and for various detectors. The tail cord 11 is connected to a control unit 14 arranged within the machine room 2 through a connection box 12 and a wiring 13 provided on a wall of the elevating passage 1. The control unit 14 is connected to an electric motor of the hoist 3 through a connection line 15, and is connected to a power line and signal lines arranged within the building.

To operate such an elevator, the hoist 3 is driven, so that the drive sheave 4 is rotated, causing the car 7 and the counterweight 8 to be vertically moved through the rope 6.

As shown in FIGS. 1 and 2, the hoist 3 includes an electric motor 16 for driving the drive sheave 4. A rotary shaft 17 of the rotor (not shown) of the electric motor 16 is rotatably supported on a pair of bearings 19A and 19B which are mounted on a machine beam 18 installed on the floor of the machine room 2. The drive sheave 4 is mounted on the rotary shaft 17. The stator of the electric motor 16 is also mounted on the machine beam 18.

Adjacent to the drive sheave 4, there is provided a braking unit 20, which includes a pair of braking arms 22A and 22B arranged to clamp a rotary drum 21 integrally formed with the drive sheave 4. The braking arms 22A and 22B are hinged at lower ends thereof to a machine beam 18 through pins P1 and P2. The braking arms 22A and 22B have braking shoes 23A and 23B respectively hinged through pins P3 and P4 to positions thereof horizontally symmetrical about the axis of the rotary shaft 17. The braking shoes 23A and 23B are respectively provided in portions, which face to the rotary drum 21, with concave curved surfaces which fit to the circumferential surface o the rotary drum 21. A lining member 24 is mounted on each of the concave curved surfaces of the braking shoes 23A and 23B.

The braking arms 22A and 22B have a rod 25 which passes at opposite ends thereof through upper portions thereof. The rod 25 is provided at opposite ends thereof with a pair of compression springs 26A and 26B mounted around them. The braking arms 22A and 22B are pulled at upper portions thereof to each other by the compression springs 26A and 26B so as to make narrow an upper space between the braking arms 22A and 22B, so that the braking shoes 23A and 23B are urged against the circumferential surface of the rotary drum 21 by a pressing force Po. The braking arms 22A and 22B and the rod 25 thus constitute braking force biasing means.

At an upper portion of the braking force biasing means there are provided a braking force releasing unit 27 for releasing braking forces of the compression springs 26A and 26B and a braking force reducing unit 28 for reducing the braking forces. In the braking force releasing unit 27 and the braking force reducing unit 28, iron cores are attached by flowing current in electromagnetic coils 33A and 33B, so that pushing rods 35A and 35B are moved to move the braking arms 22A and 22B away from each other.

Figure 4:
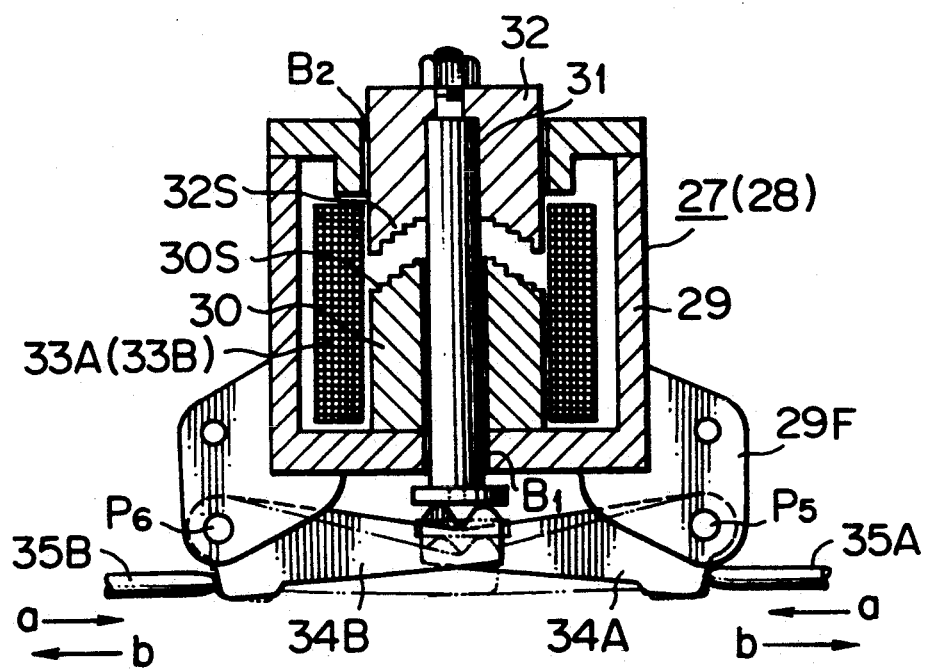
FIG. 4 is an enlarged vertical cross-sectional view illustrating the braking force releasing unit and the braking force reducing unit of FIG. 1.

The drive mechanism of each of the braking force releasing unit 27 and the braking force reducing unit 28 may be constructed as shown in FIG. 4. The drive mechanism includes a yoke 29 which constitutes a box, in which a stationary iron core 30 is mounted. A rod 31 vertically passes through the stationary iron core 30 and yoke 29, and has a movable iron core 32 mounted on an upper portion of the rod 31. An electromagnetic coil 33A (33B) is located to externally surround the stationary iron core 30. Levers 34A and 34B are arranged to make contact at inner ends thereof with the lower end of the rod 31. A pair of pushing rods 35A and 35B are provided so that they make contact at inner ends thereof with outer ends of the levers 34A and 34B, and at outer ends thereof with braking arms 22A and 22B. The yoke 29 is provided with a pair of flanges 29F and 29F, which are attached to a mounting member of the bearing member 19B (FIG. 2) for mounting the yoke 29. The bearing member 19B supports the rotary shaft 17 of the electric motor 16. The yoke 29 has bearing members B1 and B2 provided at walls through which the rod 31 and the movable iron core 32 pass, respectively. The rod 31 and the movable iron core 32 are guided by the bearing members B1 and B2, respectively. The stationary iron core 30 and the movable iron core 32 are provided at oppositely facing surfaces thereof with a stepwisely formed convex surface 30S and concave surface 32S, respectively. The levers 34A and 34B are hinged to respective flanges 29F and 29F of the yoke 29 through pins P5 and P6.

In such a construction, the movable iron core 32 is attracted and moved toward the stationary iron core 30 by supplying energizing current to the electromagnetic coil 33A (33B), so that the rod 31 is depressed. This causes the levers 35A and 35B to be displaced as shown by dots-and-dash lines in FIG. 4, using the pins P5 and P6 as pivots, and the pushing rods 35A and 35B are thus moved in respective directions indicated by the arrows b. When the electromagnetic coil 33A (33B) is not energized, as shown in FIG. 1 the pushing rods 35A and 35B are pushed in respective directions shown by arrows a by the compression springs 26A and 26B, so that the movable iron core 32 is placed in the state shown in FIG. 4.

The electromagnetic coil 33A of the braking force releasing unit 27 and usually the electromagnetic coil 33B of the braking force reducing unit 28 are connected through the control unit 14 to a power source (not shown), and switched to an emergency power source in power failure.

As shown in FIG. 1, an actuating force Fa of the braking force releasing unit 27 is set larger than an urging force Po of the braking shoes 23A and 23B to the rotary drum 21, that is, an urging force Ps by the compression springs 26A and 26B. An actuating force Fb of the braking force reducing unit 28 is set smaller than the actuating force Fa. The supply of energizing current to the electromagnetic coil 33B of the braking force reducing unit 28 is set in multi-levels by experimentally calculating it, and is selected according to emergency operation conditions, such as the moving direction, speed, and carrying capacity (load) of the car 7.

Figure 5:
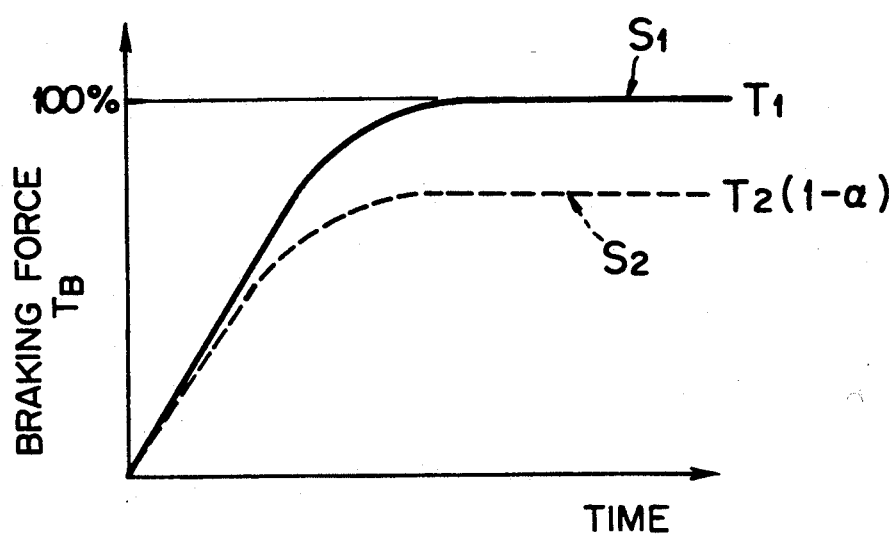
FIG. 5 is a braking force characteristic graph of the braking unit of FIG. 1.
Figure 6:
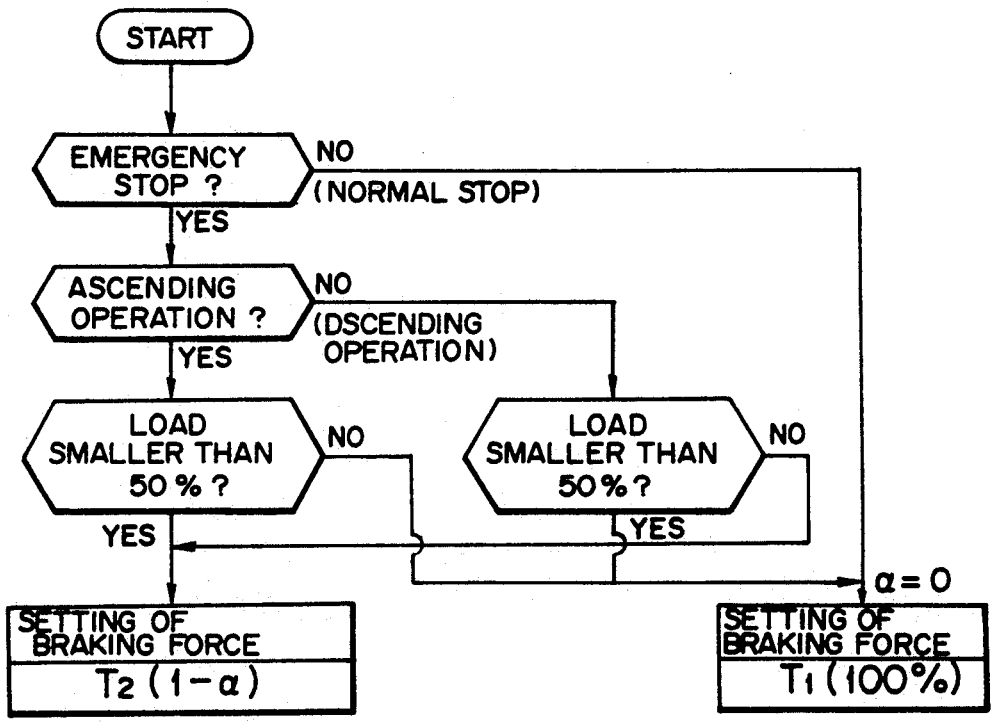
FIG. 6 is a flow chart showing a routine accompanying an emergency stoppage of the elevator apparatus of FIG. 1.

Thus, the braking unit 20 generates a braking force TB as plotted in FIG. 5. More specifically, in the case where during normal operation a car is stopped after the electromagnetic brake is activated, the function of the braking force releasing unit 27 is stopped, in other words, the supply of energizing current to the electromagnetic coil 33A is stopped. Then, the actuating force Fa instantaneously disappears, and urging forces by the compression springs 26A and 26B are applied, so that a predetermined braking force T1 (100%) is instantaneously provided as shown by the curve S1. In the case where in an emergency stop, an actuating force Fb is generated according to operation conditions, a braking force T2 $(1-\alpha)$ is produced as shown by the curve S2, the braking force T2 being reduced by the decrease ratio $\alpha$. Referring to FIG. 6 an illustration will be given on an example of which the braking unit 20 having such a characteristic is activated according to operation conditions. In FIG. 6, the braking force of the braking unit 20 is variably set using the moving direction and the load of the car. In the case where in the elevator of FIG. 3, the braking unit 20 is activated according to an emergency stop command, an operation in which an mount of slip of the rope 6 is large is an ascending operation of a car with no load or a descending operation thereof with a full load. FIG. 6 shows a flow chart in which the judgement of the load conditions is replaced by a judgement whether or not the load is smaller than 50% of the full load. More specifically, the braking force is set to T2 $(1-\alpha)$ in the case where in an emergency braking of the car the operation condition is such that (1) the car has a load smaller than 50% of the full load when the elevator is in ascending operation, and that (2) the car has a load larger than 50% of the full load when the elevator is in descending operation. In other operation conditions, the braking force is set to T1 (100%, $\alpha=0$) as in ordinary stoppage.

The cases of emergency stoppage include cases where: the governor is malfunctioned by swinging the car 7 by a passenger during travelling; the elevator is stopped by malfunction of the equipment, the elevator is suddenly stopped due to power failure. In power failure, power supply to the electromagnetic coil 33B of the braking force reducing unit 28 is stopped, and it is thus necessary to avoid such a sudden stop by switching the ordinary power source to an emergency power source. As the emergency power source cells and batteries may be used. Maintenance must be frequently made on these power sources, and is laborious. Frequent maintenance may become unnecessary if an electric power of a generator, mounted to a rotary member of the hoist 3, is used during power failure. The electromagnetic coil 33B may be always connected to the emergency power source without any switch.

Figure 7:
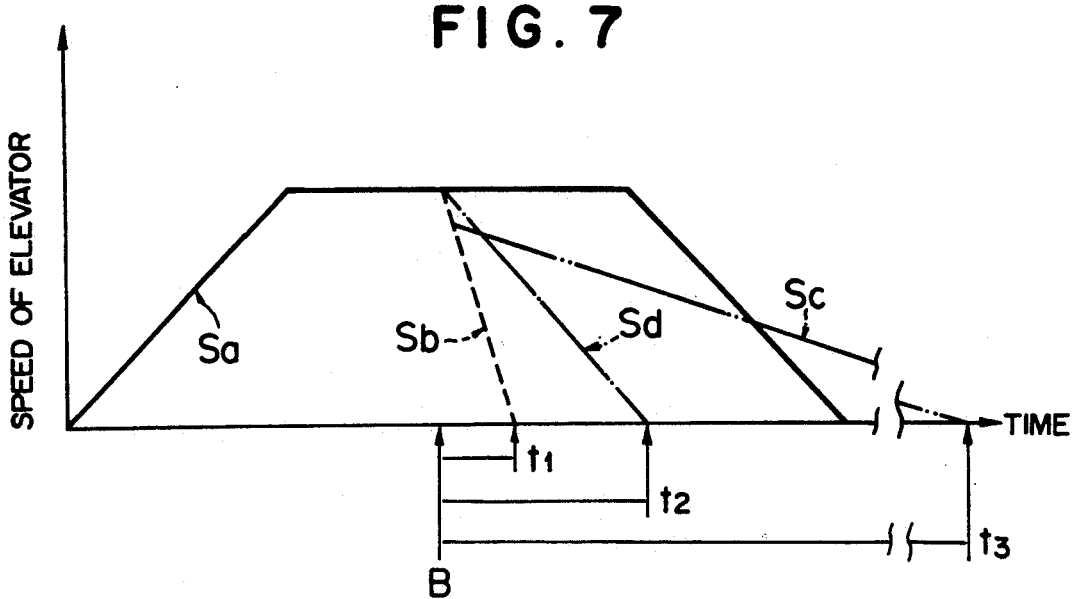
FIG. 7 is a graph of a speed characteristic of the elevator apparatus of FIG. 3.

From the foregoing, in the embodiment braking of the car according to operation conditions may be conducted even if the car is suddenly going to stop, and the slip of the rope may be hence suppressed and a stop shock to passengers may be reduced. More specifically, the elevator is normally operated at predetermined acceleration, constant speed or deceleration according to a predetermined speed pattern Sa as shown in FIG. 7. In the case where an emergency stop B command is issued at this event, 100% of braking force is produced by the braking force biasing means when energizing current to the braking force releasing unit 27 is stopped without activation of the braking force releasing unit 27. The car is suddenly stopped with a deceleration characteristic Sb if operation conditions, such as a speed, direction and load, thereof meet no slip conditions. However, the time t1 from issue of the emergency stop command B to the stop of the car is short and a stop shock is hence large. This provides uneasiness to the passengers. On the other hand, in the case where in production of 100% braking force the car is ascending with a small load, the car is decelerated according to the deceleration characteristic Sb, but the car cannot follow the sudden deceleration of the drive sheave since the counterweight which becomes heavier than the car is moved in the direction of gravity and increases in inertial force. This produces a slip between the drive sheave and the rope, and the stop time t3 thus becomes longer as in the deceleration characteristic Sc, which may cause the car to impinge upon the floor of the machine room during ascending operation, exceeding the stop position of the uppermost story, or to impinge upon a buffer mounted in an elevating passage pit during descending operation.

In such events, the function of the braking force releasing unit 27 is stopped without actuating of the braking force releasing unit 27. In other words, a supply of current to the electromagnetic coil 33A of the braking force releasing unit 27 is stopped, whereas at the same time a current supply to the electromagnetic coil 33B of the braking force reducing unit 28 is stopped. This causes a braking force to be applied to the rotary drum 21, with the spring force of the braking force biasing means being reduced, and thus the deceleration characteristic Sd is given. That is, a slip between the drive sheave and the rope is hard to take place and the stop shock is reduced whereas by reducing the braking force the time t2 from the issue of the emergency stop command to the stop of the car becomes long as compared stoppage with 100% of the braking force. In this event, the stop shock and the rope slip are considerably reduced by setting the braking force decrease ratio to a characteristic which is similar to a deceleration pattern in a normal operation.

Thus, in the control of the braking force during emergency stop, a current supply to the electromagnetic coil 33A of the braking force releasing unit 27 is stopped by the control unit 14, and current to the electromagnetic coil 33B of the braking force reducing unit 28 is supplied according to predetermined levels according to operation conditions. These enable the control to be simple and the braking force to become constant as compared to the conventional current control in which energizing current which is necessary to release the braking force at 100% is decreased to generate a braking force which produces little stop shock and little rope slip.

In FIG. 5, the curve S1 indicates a case where the car 7 shown in FIG. 3, for example, is full (the car is larger in weight than the counterweight 8), and where during ascending operation, braking force T1 is provided when an emergency stop command is issued. In this case, the deceleration becomes large since the car 7 which is heavier than the counterweight 8 ascends against gravity, and therefore if braking force is applied, the drive sheave 4 is stopped without any slip between the drive sheave and the rope 6. There may be a case where an emergency stop command is issued when the car 7 is ascending with no passenger (the car is smaller in weight than the counterweight 8). When in this case, a braking force T1 is provided, inertial force becomes large since not the car 7 but the counterweight 8 is moving in the direction of gravity. When the rotation of the drive sheave 4 is rapidly decelerated in this state, the rope 6 slips over the drive sheave 4. To avoid this, the braking force T2 which is smaller than the braking force T1 is provided for preventing rapid stop of the drive sheave 4 and for eliminating the slip of the rope 6.

After the car 7 is stopped, the braking force T2 may be continuously applied, or may be switched to 100% braking force T1 to hold the car 7.

Although in the embodiment as the braking force biasing unit compression springs 26A and 26B are used, electromagnetic force or hydraulic force may be used to produce braking force. In place of the electromagnetic coil 33B of the braking force reducing unit 28, electromagnetic coils which are different in attraction force may be used, and may be selectively activated when an emergency stop command is received.

Figure 8:
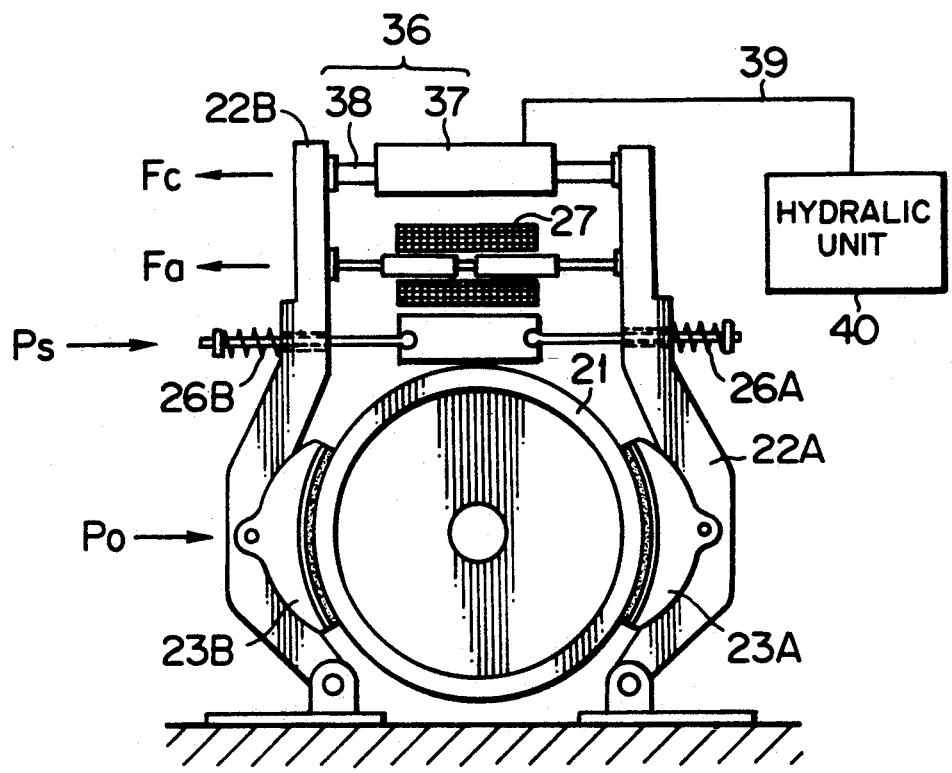
FIG. 8 is a front view of a braking unit of an elevator apparatus as another embodiment of the present invention.
Figure 9:
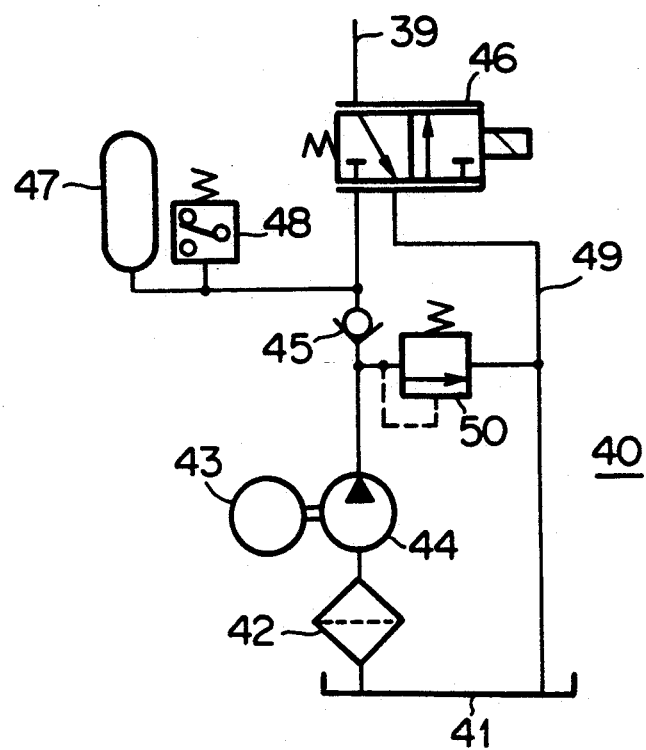
FIG. 9 is a hydraulic circuit diagram of a hydraulic unit used in the braking unit shown in FIG. 8.

FIG. 8 illustrates another embodiment of the present invention, which is similar to the preceding embodiment in the construction such that the braking shoes 23A and 23B are urged against the rotary drum 21 by an urging force Po caused by the urging force Ps of the braking force biasing means which includes the compression springs 26A and 26B to thereby produce a braking force. Furthermore, this embodiment is similar to the above embodiment in mechanism and function to release the braking force by the actuating force Fa of the braking force releasing unit 27. This embodiment is distinct from the preceding embodiment in that the braking force reducing unit 36 is driven by hydraulic oil. The braking force reducing unit 36 includes a hydraulic cylinder 37 and a hydraulic plunger 38, which is arranged to move away the braking arms 22A and 22B from each other. Hydraulic oil in the hydraulic cylinder 37 is supplied to or discharged from the hydraulic unit 40 through the duct 39. In supply of the hydraulic oil, an actuating force Fc which is against the pressure Ps is generated to reduce the urging force Po. The control of the hydraulic oil supplied from the hydraulic unit 40, that is, the control of the actuating force Fc is conducted according to operation conditions of the car 7 as in the preceding embodiment. In the hydraulic unit 40 for performing such a control, as shown in FIG. 9 working oil in an oil tank 41 is sucked through a filter 42 by an hydraulic pump 44 which is driven by an electric motor 43, and is pumped through a check valve 45. The check valve 45 is connected to the duct 39 through a control valve 46. Between the check valve 45 and the control valve 46 there is interconnected an accumulator 47, of which hydraulic pressure is checked by a pressure switch 48. A duct 49 is connected to the control valve 46 for returning oil to the oil tank 41, and the discharge port of the hydraulic pump 44 is connected to the duct 49 through a relief valve 50. In the hydraulic unit 40, working oil which has been sucked by the hydraulic pump 44 is accumulated at a predetermined pressure in the accumulator 47. The pressure in the accumulator 47 is checked by the pressure switch 48, which according to the checked pressure energizes or stops the electric motor 43. In the case where the hydraulic plunger 38 of the braking force reducing unit 36 is to be driven in an emergency stop, working oil in the accumulator 47 flows into the duct 39 by moving the control valve 46 to the left from the position shown. Thus, working oil is supplied to the hydraulic cylinder 37 of FIG. 8 to move the hydraulic plunger 38, so that the braking arms 22A and 22B are moved away from each other against the compression springs 26A and 26B. After the emergency stoppage is completed, the control valve 46 is returned to the state of FIG. 9, and then working oil in the hydraulic cylinder 37 is discharged by returning of the hydraulic plunger 38 due to the compression springs 26A and 26B. Thus, working oil is recovered to the oil tank 41 through the duct 39, the control valve 46 and the duct 49.

Figure 10:
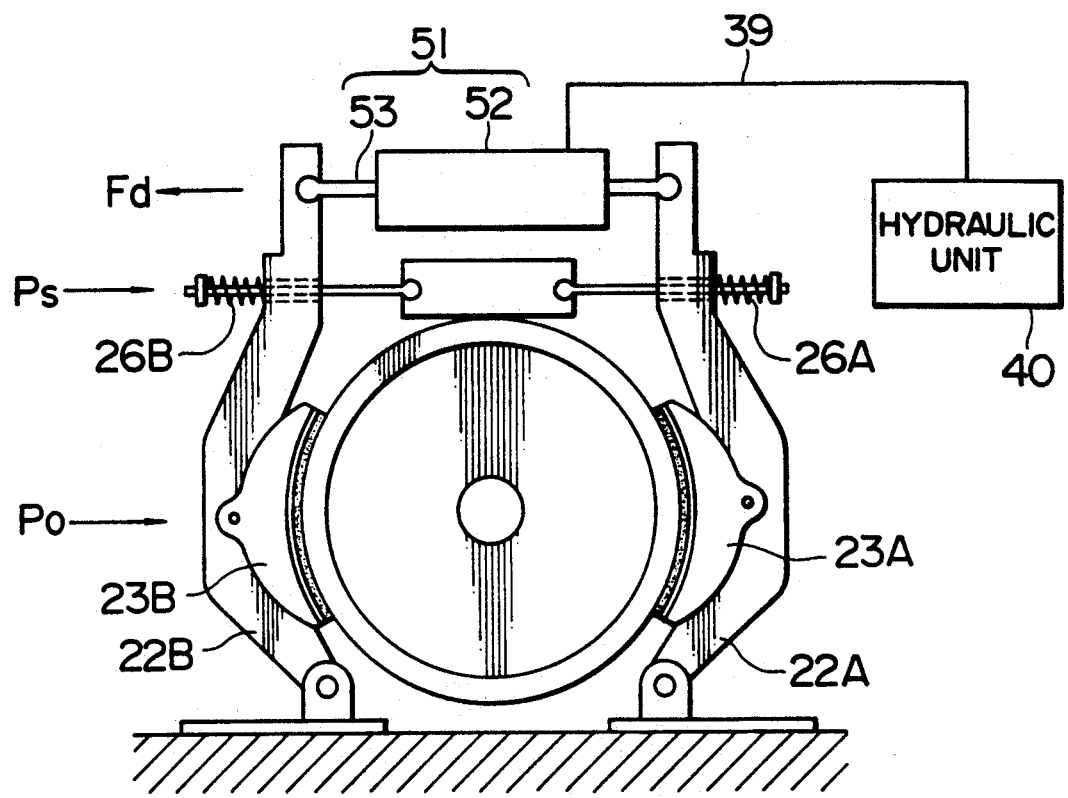
FIG. 10 is a braking unit of an elevator apparatus as still another embodiment of the present invention.
Figure 11:
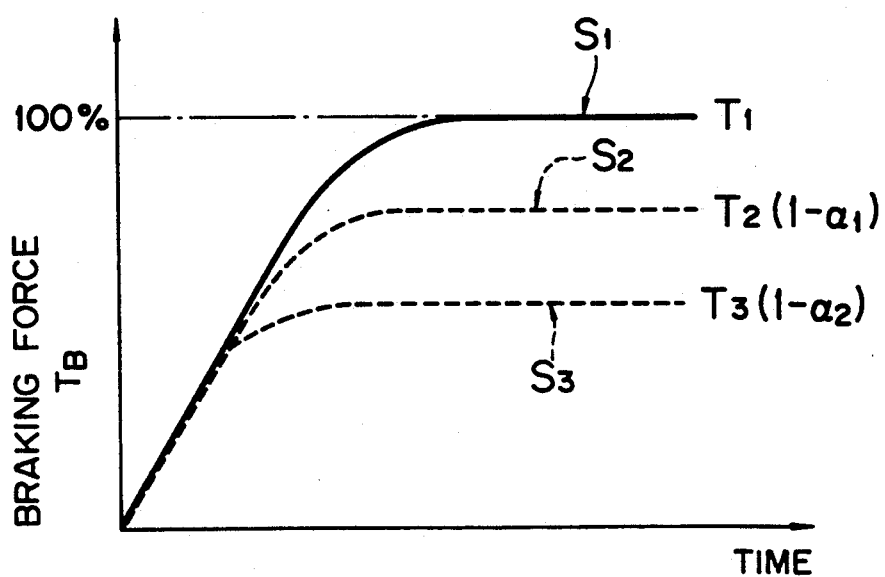
FIG. 11 is a braking force characteristic graph of the braking unit shown in FIG. 10.

FIG. 10 illustrates still another embodiment of the present invention. This embodiment is similar to the embodiment of FIG. 8 in that the braking force reducing unit is actuated by hydraulic oil, but is distinct in that a braking force reduction unit 51 serves also as braking force releasing unit. More specifically, this embodiment is similar to the preceding embodiments in that urging force Po is generated in each of the braking shoes 23A and 23B through braking arms 22A and 22B due to pressure Ps of the braking force biasing unit by the compression springs 26A and 26B. The braking force reduction unit 51 is constituted by an hydraulic cylinder 52 and an hydraulic plunger 53. The braking arms 22A and 22B are moved away from each other by supplying or discharging hydraulic oil from the hydraulic unit 40 to the hydraulic cylinder 52 through the duct 39. The actuating force to release the urging force Po and the actuating force to reduce the urging force Po are generated in the same hydraulic cylinder 52. That is, the hydraulic unit 40 controls the actuating force Fd of the hydraulic cylinder 52 so that the actuating force Fd may change in a multi-stage manner and in a wide range. Braking force TB of the braking unit having such a feature changes as shown in FIG. 11. When urging force Po is released by enlarging the interval between braking arms 22A and 22B by supplying hydraulic oil to the hydraulic cylinder 52 of the braking force reduction unit 51, the braking force is released, and the braking force reduction unit 51 serves as a braking force reduction unit. One hundred percent of braking force T1 is produced as indicated by the curve S1 if no hydraulic oil is supplied to the hydraulic cylinder 52. Furthermore, by controlling a supply of hydraulic oil to the hydraulic cylinder 52 according to operation conditions, braking forces T2 and T3 with decrease ratios $\alpha_1$ and $\alpha_2$ are produced as indicted by curves S2 and S3, respectively.

Figure 12:
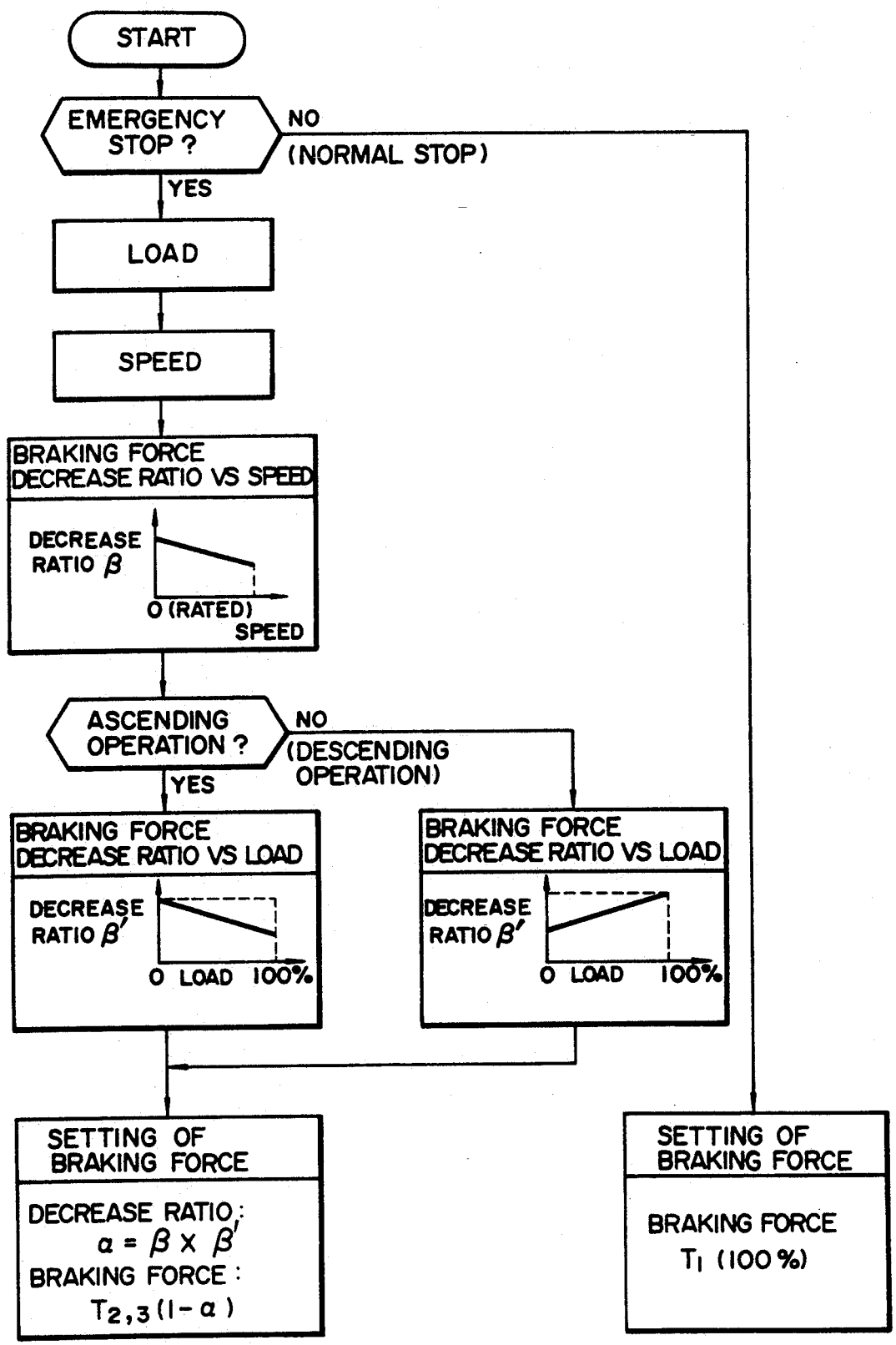
FIG. 12 is flow chart showing a routine including judgments accompanying emergency stops of the elevator apparatus of the third embodiment of the present invention.

By using a braking unit having such a braking force characteristic, braking control according to operation conditions of the flow chart of FIG. 12 can be achieved. The operation conditions include a speed, a load, and a direction of operation of the car. Here, braking force decrease ratio $\beta$ to speed and braking force decrease ratio $\beta'$ to load are defined as respective functions as shown in FIG. 12, and these functions are combined with operation direction conditions. Then, an operation is made between the braking force decrease ratio $\beta$ to speed and the braking force decrease ratio $\beta'$ to load to set braking forces T1 to T3. This embodiment enables braking forces, necessary according to differences in operation conditions, to be finely set, and the amount of rope slip in emergency stop is controlled.

In FIGS. 6 and 12, the final braking force is determined by the operation direction and the load. Instead of detecting the operation direction and the load, the tension of the rope 6 which suspends the car 7 of FIG. 3 may be detected for calculating braking force.

Figure 13:
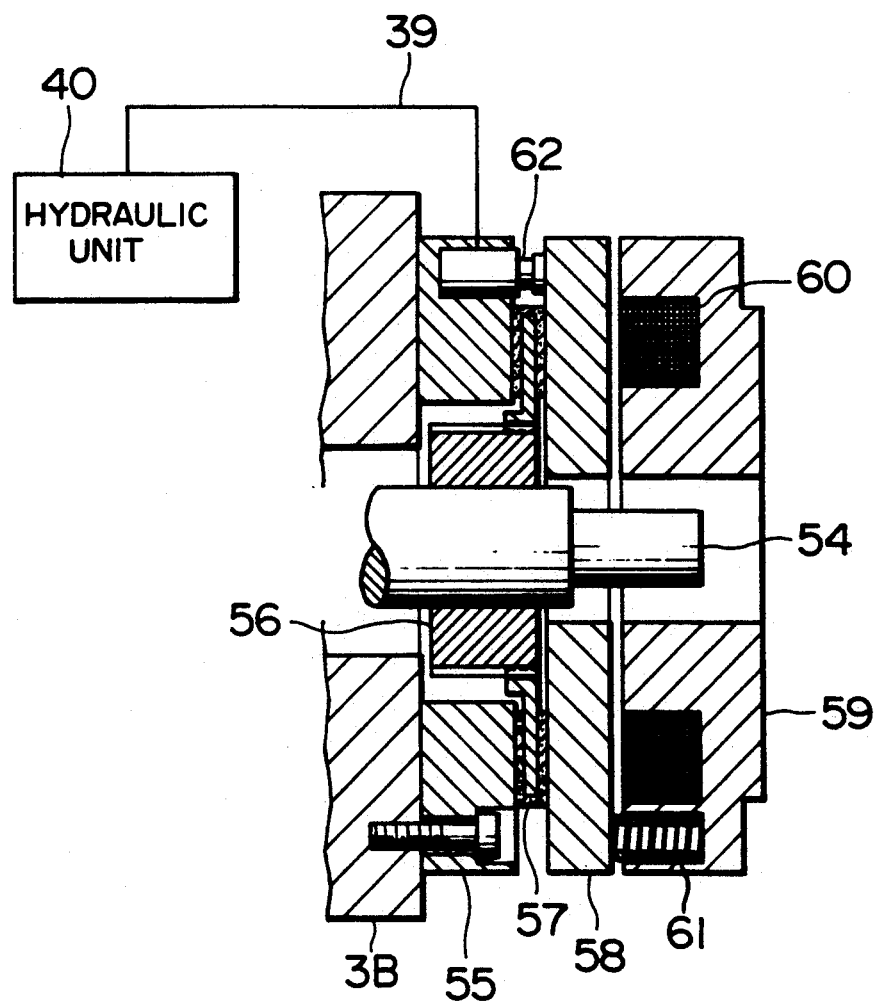
FIG. 13 is a vertical cross-sectional view of a braking unit of an elevator apparatus as another embodiment of the present invention.

FIG. 13 illustrates a disk-shaped braking unit distinct from the preceding embodiments. In this disk-shaped braking unit, a rotary shaft 54 is extended to pass through a mounting base 3B of a hoist, and a ring-shaped mounting member 55 is mounted to the mounting base 3B. The mounting member 55 includes opposite ends which are concentric with the rotary shaft 54 and perpendicular to the axis of the rotary shaft 54. The rotary shaft 54 which passes through the mounting member 55 has a splined boss 56 mounted around it. A rotary disk 57 is axially movably engaged with the splined boss 56, the rotary disk 57 holding a lining member on the opposite surfaces thereof. The rotary disk 57 oppositely faces at one surface thereof to one end of the mounting member 55 whereas the other surface faces to one side of a disk-shaped armature 58. On the other side of the disk-shaped armature 58 there is disposed an iron core 59. The armature 58 and the iron core 59 are supported on rods (not shown) which are parallel with the rotary shaft 54, and which are fixed to the mounting member 55. The armature 58 is supported for axial movement. The iron core 59 is provided with a coil 60, which is concentric with the rotary shaft 54, and the iron core 59 moreover has several compression springs 61, 61, . . . embedded in it for urging the armature 58 against the rotary disk 57. The mounting member 55 is provided with several hydraulic jacks 62, 62, . . . which are capable of moving the armature 58 toward the iron core 59. The hydraulic jacks 62, 62, . . . are connected through a duct 39 to a hydraulic unit 40 having the same construction and function as the hydraulic unit 40 described with reference to FIG. 9.

In the braking unit of FIG. 13, the rotary disk 57 is in a state of stopping the car in which it is sandwiched between the mounting member 55 and the armature 58 urged by the compression springs 61, 61, . . . . The armature 58 is attracted to the iron core 59 against the compression springs 61, 61, . . . by supplying energizing current to the coil 60 in this state, so that the rotary disk 57 is released from the sandwiching clamp between the mounting member 55 and the armature 58, and may be freely rotated. In the case where an emergency stop command is received when the rotary disk 57 is rotatable, that is, the car is vertically being moved, the car is stopped by optimal braking force provided as 100% one by solely using the compression springs 61, 61, . . . or weakened by using the hydraulic jack 62 and the compression springs 61, 61 . . . together. Thus, also in this braking unit the slip between the drive sheave and the rope is prevented and stop shock is reduced.

Furthermore, the braking apparatus according to each embodiment has the braking reducing unit merely added to the conventional braking apparatus, so that the size of the braking apparatus is substantially the same one as that of the conventional unit. Accordingly, it is unnecessary to particularly increase the space for setting the braking apparatus, and further the adjustment of the braking force is facilitated by selecting it.

What is claimed is:

1. An elevator apparatus comprising:
   a hoisting unit including a drive sheave for winding a rope therearound, the hoisting unit including a rotary member, the rope having a car attached at one end thereof for suspending;
   braking force biasing means for biasing a braking force against the rotary member;
   releasing means for releasing the braking force against the rotary member; and
   reducing means for actuating independent of said braking force releasing means at the same time with an actuation thereof and reducing an absolute value of the braking force against the rotary member.

2. An elevator apparatus as recited in claim 1, wherein the braking force reducing means includes an electromagnetic drive mechanism.

3. An elevator apparatus as recited in claim 1, wherein the braking force reducing means comprises an plurality of electromagnetic drive mechanisms.

4. An elevator apparatus comprising:
   a hoising unit including a drive sheave for winding a rope therearound, the hoisting unit including a rotary member, the rope having a car attached at one end thereof for suspending;
   braking force biasing means for biasing a braking force against the rotary member;
   releasing means for releasing the braking force against the rotary member;
   reducing means for actuating independent of said braking force releasing means and at the same time with an actuation thereof and reducing an absolute value of the braking force against the rotary member; and
   means for deactivating the braking force biasing means and for activating the braking force reducing means when an emergency stop command is received.

5. An elevator apparatus comprising:
   a hoisting unit including a drive sheave for winding a rope therearound, the hoisting unit including a rotary member, the rope having a car attached at one end thereof for suspending;
   braking force biasing means for biasing a braking force against the rotary member;
   releasing means for releasing the braking force against the rotary member; and
   a hydraulic drive mechanism for reducing the braking force against the rotary member.

6. An elevator apparatus as recited in claim 5, wherein the hydraulic drive mechanism has multi-stage braking force decrease ratios.

7. An elevator apparatus as recited in claim 5, wherein the hydraulic drive mechanism has a variable braking force decrease ratio.

8. An elevator apparatus as recited in claim 5, wherein the hydraulic drive mechanism achieves the function of the braking force releasing means for performing one of releasing and reducing of the breaking force in response to an operation state of the car.

9. An elevator apparatus comprising:
   a hoisting unit including a drive sheave for winding a rope therearound, the hoisting unit including a rotary member, the rope having a car attached at one end thereof for suspending;
   braking force biasing means for biasing a braking force against the rotary member;
   releasing means for releasing the braking force against the rotary member; and
   limiting means for actuating independent of said braking force releasing means and at the same time with an actuation thereof when a deceleration command is received and limiting an absolute value of the braking force against the rotary member.

10. An elevator apparatus comprising:
    a hoisting unit including a drive sheave for winding a rope therearound, the hoisting unit including a rotary member, the rope having a car attached at one end thereof for suspending;
    braking force biasing means including a braking member and for urging the braking member against the rotary member to bias the braking force;
    releasing means for releasing the braking force against the rotary member;

limiting means for actuating independent of said braking force releasing means and at the same time with an actuation thereof when a deceleration command is received and limiting an absolute value of the braking force against the rotary member; and operation state judging means for judging an operation state of the car to activate the baking force limiting means.

11. An elevator apparatus of the type in which a hoist is provided with a braking unit including braking force biasing means and braking force releasing means, and a car is vertically moved by a rope wound around a drive sheave of the hoist, said apparatus comprising:

braking force reducing means for reducing an absolute value of a braking force produced by the braking force biasing means of the braking unit and actuating independent of said braking force releasing means and at the same time with an actuation thereof; and emergency power source for driving the braking force reducing means in power failure.

12. An elevator apparatus of the type in which a hoist is provided with a braking unit including braking force biasing means and braking force releasing means, and a car is vertically moved by a rope wound around a drive sheave of the hoist, said apparatus comprising:

braking force reducing means for reducing an absolute value of a braking force produced by the braking force biasing means of the braking unit and actuating independent of said braking force releasing means and at the same time with an actuation thereof;

operation state judging means for judging an operation state of the car to activate the braking force reducing means; and an emergency power source for driving the braking force reducing means in power failure.

13. An elevator apparatus of the type in which a hoist is provided with a braking unit including braking force biasing means and braking force releasing means, and a car is vertically moved by a rope wound around a drive sheave of the hoist, said apparatus comprising:

braking force reducing means for reducing an absolute value of a braking force produced by the braking force biasing means of the braking unit and actuating independent of said braking force releasing means and at the same time with an actuation thereof;

a power source for driving the braking force reducing means;

an emergency power source for driving the braking force reducing means; and switching means for switching the power source and the emergency power source.

14. An elevator apparatus as recited in claim 11, 12 or 13, wherein the emergency power source is a generator which is driven by the hoist.

15. An elevator apparatus of the type in which: a hoist includes a drive sheave driven by an electric motor, a rotary drum to which a torque of the drive sheave is transmitted, a pair of braking arms arranged at positions to clamp a peripheral surface of the rotary drum, one end of each braking arms being pivotally supported, a braking shoe pivotally supported on each braking arm, the braking shoe located to face the peripheral surface of the rotary drum, a spring for reducing an interval between the braking arms to urge the braking shoes against the peripheral surface of the rotary drum, and braking force releasing means for releasing an urging force caused by the spring by enlarging the interval between the braking arms during operation; the hoist is disposed in a machine room located at a top portion of an elevating path; and a car is vertically moved by a rope wound around the drive sheave, said apparatus comprising, urging force reducing means for reducing the urging force produced by the spring by applying a hydraulic force to the braking arms in a direction to enlarge the interval of the pair of braking arms, said urging force reducing means being provided between said pair of braking arms.

* * * * *